No. 862,940.   PATENTED AUG. 13, 1907.
H. RICHARDSON.
AUTOMATIC WEIGHING MACHINE.
APPLICATION FILED DEC. 18, 1906.
3 SHEETS—SHEET 3.
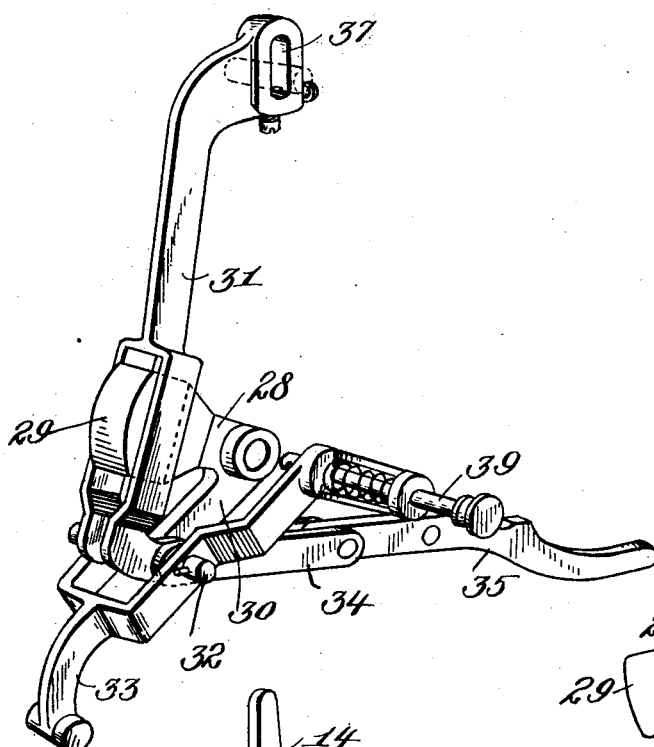
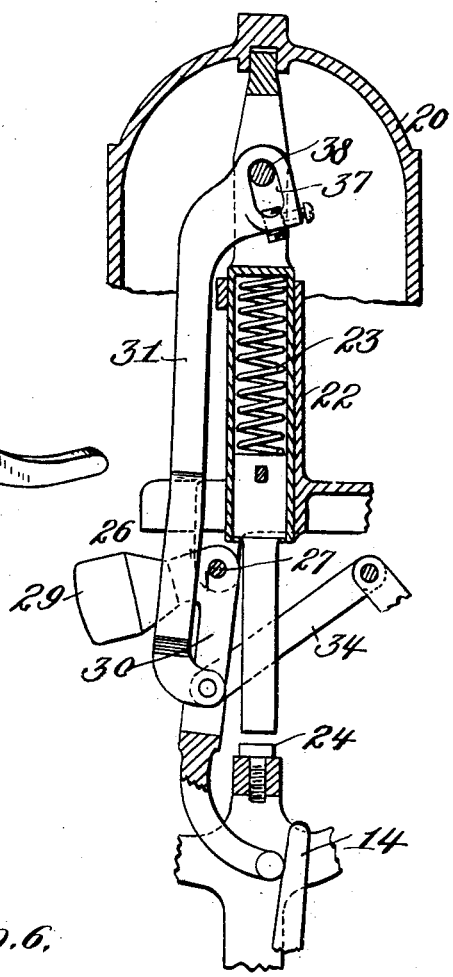
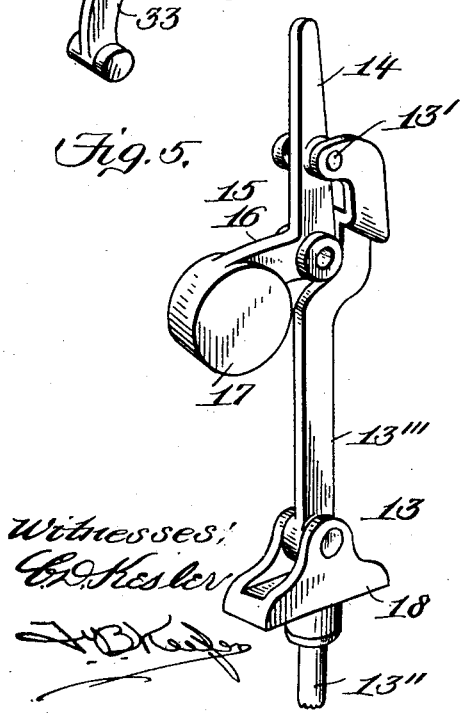
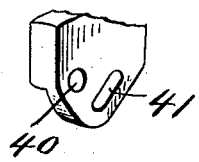
Witnesses:
Inventor
Henry Richardson
By James L. Norris,
Atty.

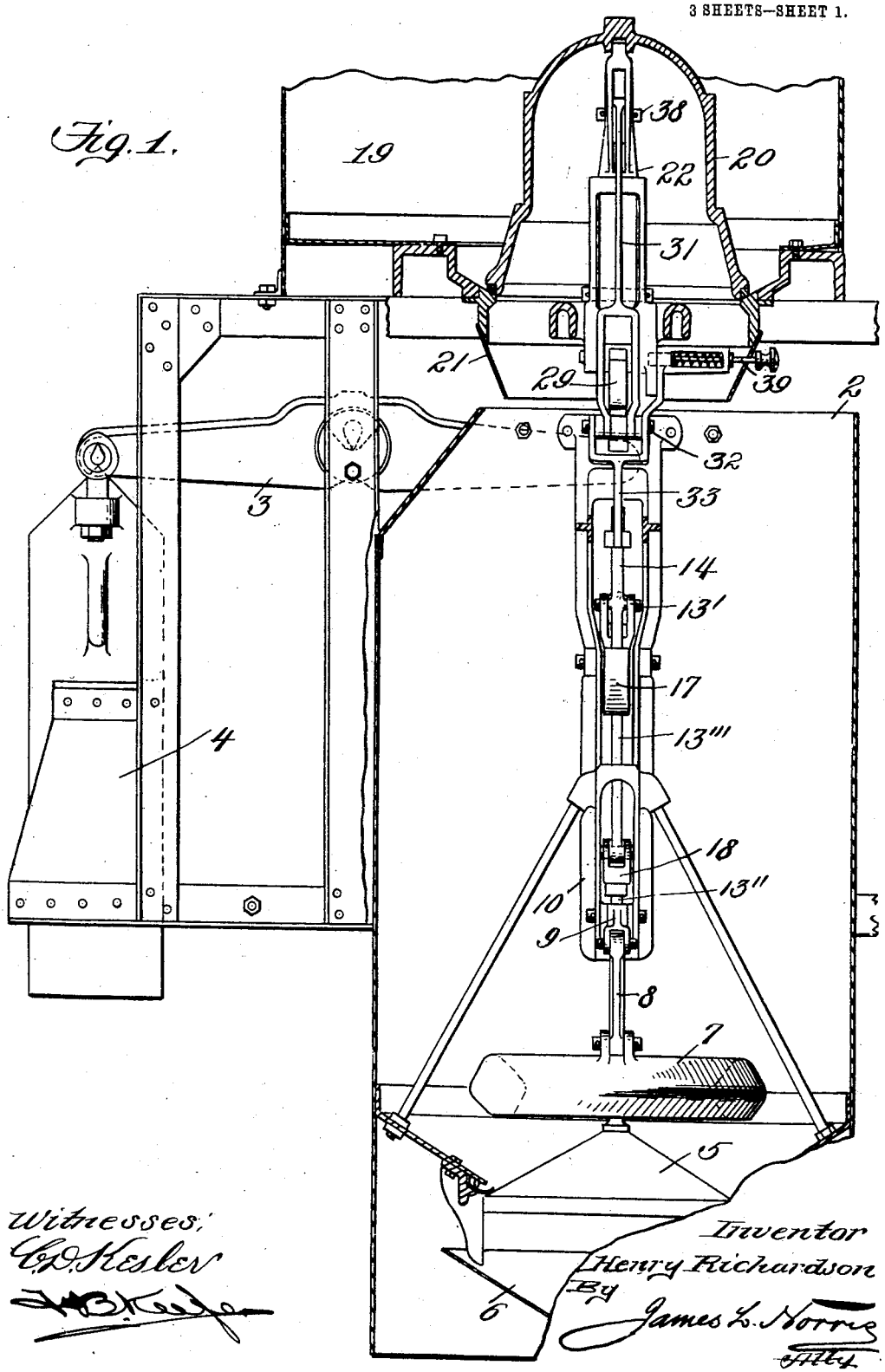

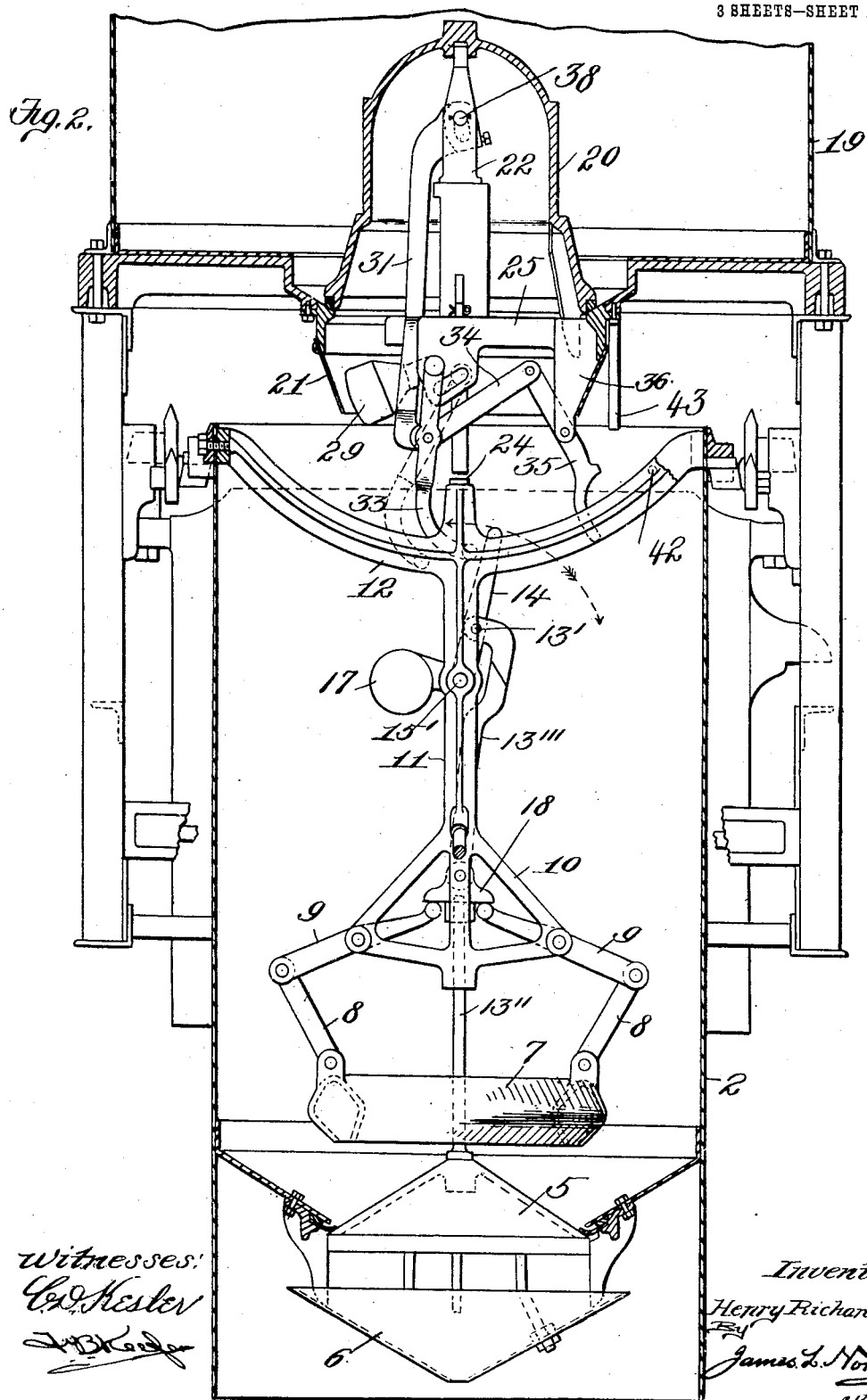

UNITED STATES PATENT OFFICE.

HENRY RICHARDSON, OF NEW YORK, N. Y.

AUTOMATIC WEIGHING-MACHINE.

No. 862,940.   Specification of Letters Patent.   Patented Aug. 13, 1907.

Application filed December 18, 1906. Serial No. 348,433.

*To all whom it may concern:*

Be it known that I, HENRY RICHARDSON, a subject of the King of Great Britain, residing at New York, in the county of New York and State of New York, have invented new and useful Improvements in Automatic Weighing-Machines, of which the following is a specification.

This invention relates to automatic weighing machines.

A weighing machine involving my invention may be advantageously employed for weighing liquid, granular, and other substances.

In the drawings accompanying and forming a part of this specification I show in detail one form of embodiment of the invention, which, to enable those skilled in the art to practice the same, will be fully set forth in the following description, while the novelty of the invention will be included in the claims succeeding said description.

In this particular form of embodiment of the invention, the machine is adapted primarily for weighing liquids, which this said machine does in a rapid, effective, and accurate manner.

Referring to said drawings: Figure 1 is a sectional side elevation of a weighing machine involving my invention. Fig. 2 is a sectional front elevation of the same. Fig. 3 is a perspective view of the toggle mechanisms coöperative with the supply controlling valve. Fig. 4 is a detail view of a part of the valve, telescopic member, part of the toggle mechanisms, and an actuator for said member. Fig. 5 is a perspective view of the upper end of the closer locking toggle; and Fig. 6 is a similar view of a portion of a bracket.

Like characters refer to like parts throughout the several figures.

The weighing mechanism shown in the drawings includes in its construction as usual a bucket or weighing hopper, as 2, carried upon the poising side of a beam, as 3, having counterweights, as 4, of a mass sufficient in practice to counterbalance the bucket, its adjuncts, and liquid or other contents. The bucket has in its bottom the usual closer controlled outlet through which, when the closer is opened, the load within the bucket may pass. The closer may take any desirable form. That represented in the drawings is denoted by 5 and is shown consisting of a substantially conical valve, which, when shut, fits in the bucket. From the closer or discharge valve 5 there is pendent a receptacle or regulator, as 6, having in its bottom an outlet through which the liquid may flow. When the closer or valve 5 is opened, the liquid in the bucket or weighing hopper 2 passes therefrom and enters the receptacle 6 and passes from the outlet in said receptacle. The receptacle is adapted to contain an amount of liquid for a sufficient length of time to hold the closer or valve 5 open or down a sufficient time to insure the entire contents of the bucket being discharged therefrom.

When the closer shutting device overbalances the weight of the receptacle 6 plus its contents, said weight instantly returns said closer or valve to its shut position. The weight shown for shutting the closer is designated by 7, and it is represented as being of substantially annular shape and as having pivoted thereto at diametrically opposite points companion links, as 8, converging upward and connected at their heads with the outer ends of levers 9, which levers are shown as fulcrumed between their ends to the lower angles of an approximately triangular bracket 10 forming the base of the hanger 11 depending from the substantially central portion of the inversely arched bar 12, which, as is seen, is located in the bucket and rigidly connected suitably with the opposite sides thereof.

I have shown as connected with the closer or valve 5 an upwardly extending rod 13, the upper end of which is represented as jointed or pivoted at 13′ to the normally upright arm 14 of an angle lever 15, the normally horizontally disposed arm 16 of said angle lever having a weight as 17 which brings the closer locking toggle of which the angle lever and rod 13 form parts to its closer locking position. The angle lever 15 is shown as pivotally mounted at 15′ upon the hanger 11. The rod 13 is connected with the arm 14 between the ends thereof, whereby an operating device hereinafter described can act against the upper end of the arm 14 to unlock said closer locking toggle. On the rod 13 I have shown a projecting member 18 against which the inner ends of the levers 9 bear. It will be assumed that the closer or discharge valve 5 is open and that the weight 7 is up. When this weight 7 overbalances the receptacle or regulator 6, it drops, and, in doing so, thrusts the rod 13 upward while the weight 7 brings the arm 14 to its normal upright position to bring the closer locking toggle to a locked position, the pivots 13′ and 15′, when said toggle is in its locking relation, being in perpendicular alinement.

I have shown over the bucket or weighing hopper 2 a supply tank, as 19, which serves as a convenient means for delivering the substance to be weighted to the bucket, for which purpose said tank or supply hopper is represented as having in its bottom a discharge outlet controlled by a valve, as 20. The valve 20 is shown as of bell or inverted cup-shape and is adapted, when closed, to fit against a seat within the depending spout 21 of said hopper or supply tank 19.

As will hereinafter appear, there are two toggle devices coöperative with the supply controlling valve 20, the main one of which is adapted to lock said valve shut and is adapted to also coöperate or reciprocate with the closer locking toggle, while the auxiliary one of which is adapted to temporarily hold the valve in its drip or dribble position, so as to permit a reduced stream to flow from the tank 19 into the bucket 2 to complete a partially made up load therein.

I have shown as connected with the top of the valve 20 a telescopic rod 22 between the sections of which is disposed a coiled spring 23, and the lower end of which is operable by the weighing mechanism, such, for example, as by an adjustable actuator 24 carried on the upper side of the arched cross bar 12. This actuator may consist of a headed screw tapped into said bar. When the bucket 2 is up and empty, the actuator 24 will bear against the lower end of the longitudinally extensible or telescopic rod 22. When a certain amount of liquid has passed into the bucket, the latter will descend and the valve will descend therewith, and this motion will be continued until the major part of the load is in the bucket, at which time further motion of the valve will be positively arrested, or permit a thin or attenuated stream to pass into the bucket to complete the load. During the flow of this reduced stream the bucket is settling further and the actuator 24 will descend away from the telescopic rod 22. When the load is completed, the valve 20 is released by means coöperative with the weighing mechanism, so that it can shut by its own weight, and means are provided for positively locking the valve in such shut position as soon as the load is completed, so that, when the discharge takes place, the upper or stream controlling valve 20 will not be open. As soon as a small quantity of liquid or other material has passed from the bucket, the same is caused to rise by the descent of the counterweights 4, and, when the bucket has ascended a certain distance, the actuator 24 will strike against the lower end of the telescopic rod 22 and will thrust the lower section thereof upward, and thereby compress the spring 23, but will not open the valve 20 owing to the fact that said valve, at this time, is positively locked shut. When, however, the lower valve or closer 5 shuts, the upper valve will be thereby released, so that it can be opened by the power of the compressed coiled spring 23. The telescopic rod 22 is represented as passing through a hub at the outer end of the bracket 25 within the spout 21, by which means said rod and thereby the valve 20 are guided vertically.

An angle lever 26 is shown as pivotally mounted at 27 at its angle to the bracket 25, the arms of said angle lever being represented at an acute angle to each other, and the arm 28 thereof having a weight 29, while the other arm 30 is shown as jointed to the lower end of a link 31 loosely connected at its upper end with the upper section of the telescoping rod 22. The pivot 32 connecting the angle lever 26 and link 31 also serves as a pivot for the lever 33 and for the link 34, said link 34 being jointed to a link as 35 supported for rocking motion between its ends by a bracket as 36. The angle lever 26 and link 31 constitute the main or valve locking toggle to which I have hereinbefore referred, while the two links 34 and 35 constitute the auxiliary toggle to which I have also hereinbefore referred, the latter toggle serving to maintain the valve 20 in a drip or dribble position for a predetermined time or until the auxiliary toggle is broken. The upper end of the link 31 is shown as having an elongated slot 37, against the upper wall of which a pin, as 38, on the rod 22 engages when the valve 20 is open its maximum extent. The lever 33 is connected with the angle lever 26 and link 31 between its ends by the pivot 32, whereby the lower arm of said lever 33 may actuate under normal conditions the closer locking toggle to release the same, and whereby said closer locking toggle, when it has practically resumed its operative relation, can actuate said lever 33 to effect the release of the valve 20.

The lever 33 is represented as carrying at its upper end a spring controlled pin 39 adapted to fit either the hole 40 or the elongated slot 41 in the bracket 25. Normally, the pin 39 fits the hole 40. When it becomes necessary to test the accuracy of the machine, the pin 39 is removed from the hole 40 and the lever 33 is swung over until the inner end of said pin 39 can enter the slot 41. The valve 20 at this time may freely close, but the lower end of the lever 33 will not, when said valve is closed, strike against the closer locking toggle, so that the contents of the bucket will not be discharged. This operation is followed when a test of the accuracy of the machine is to be made, at which time a full and complete load should be in the bucket.

It will be understood that the connection between the link 31 and valve 20 is such as to permit relative movement of these parts, and that, at the commencement of operation, the pin 38 is at the upper end of the slot. At this time the lower end of the rod 22 will be against the actuator 24. The links 34 and 35 will be in line; the pivots 13' and 15' will also be in line; while the pin 38 and pivots 27 and 32 will be out of line. The valve, therefore, being wide open and there being liquid in the supply tank 19, a stream of liquid will flow from the tank by the wide open valve into the empty bucket, the closer 5 of which is shut. When a certain amount of liquid is in the bucket, the latter will descend and the actuator 24 will descend therewith to permit the valve 20 to move towards its closed position, during which motion the pin 38 is traveling down the slot 37, so that, at the conclusion of such motion, said pin will abut against the lower wall of said slot. The valve 20, at this time, is held from final shutting by the straightened toggle links 34 and 35, so that a reduced stream can flow into the bucket to complete the load therein. On the completion of the load, an actuator, which may consist of a pin 42 on the cross bar 12, strikes against the outer toggle link 35 and flexes the toggle formed by said link 35 and link 34, thereby releasing the valve 20, so that the same can be shut and locked shut.

It will be understood that, when the drip or dribble stream is flowing into the bucket to complete the partial load therein, the actuator 24 is passing from under the lower end of the telescopic rod 22, and further, that the pin 42 strikes the link 35. When the toggle formed by the links 34 and 35 is broken, the toggle formed by the link 31 and angle lever 26 can be moved to its valve locking position by the weight 29 which drops for this purpose, and, as said weight 29 drops, the pin 38, pivot 27, and pivot 32 are brought into line, so that the toggle made up of the link 31 and angle lever 27 is thereby locked to hold the valve 20 shut. During the movement of the angle lever 26 on the final closing movement of the valve 20, the lever 33 is swung on the pin 39 as a center and its lower arm or branch is carried forcibly against the upper end of the rod 13 to throw the pivots 13' and 15' out of line and thereby release the closer 5, so that the weight of the liquid in the bucket can open said closer, which, as previously stated, is held open for a sufficient length of time to insure the complete emptying of the contents thereof. As the rod 13 practically resumes its normal position, the upper end thereof will strike against the lower end of the lever 33, so as to break the main valve-controlling toggle formed by the angle lever 26 and link 31 and permit the opening of the valve 20 by the power of the spring 23, as hereinbefore set forth.

When the links 34 and 35 are alined, the outer link 35 bears against a stop, as 43, depending from the tank 19, which stop prevents downward flexure of the toggle links 34 and 35.

I have hereinbefore described the construction and mode of operation of the machine in detail, so that I deem it unnecessary to repeat a description of the operation any more than to state that the stream of material is supplied to the bucket of the machine. When a load is made up in the bucket, such stream is cut off while the contents of the bucket are discharged. When the valve or closer of the bucket is shut, the supply valve is opened, and these operations occur automatically in proper sequence.

I have described a rod 13 hereinbefore, and have stated that said rod is equipped with a projection 18. I deem it desirable to make clear that this rod is shown as consisting of a lower section 13″ and an upper section 13‴. The projection 18 constitutes a head for the lower rod section 13″, which latter is connected rigidly with the closer 5, while the rod section 13‴ is pivotally connected with said head or projection 18. This construction provides for the proper swinging of the upper portion of said rod 13.

What I claim is:

1. The combination of weighing mechanism including a bucket, means for supplying a stream of material to said bucket, a valve for controlling said stream, and coöperative toggles, one for locking the valve shut and the other for holding the valve against closing movement.

2. The combination of weighing mechanism including a bucket, means for supplying a stream of material to said bucket, a valve for controlling said stream, means operative with the weighing mechanism for permitting the valve to close on the descent of the bucket, a toggle for arresting the full closing movement of the valve during the final descending motion of the bucket, and means operative with the weighing mechanism for breaking said toggle to thereby permit the closing of said valve.

3. The combination of weighing mechanism including a bucket, means for supplying a stream of material to said bucket, a valve for controlling said stream, means operative with the weighing mechanism for permitting the valve to close on the descent of the bucket, a toggle for arresting the full closing movement of the valve during the final descending motion of the bucket, and means on the bucket for breaking said toggle to thereby permit closing of said valve.

4. The combination of weighing mechanism including a bucket, means for supplying a stream of material to said bucket, a valve for controlling said stream, means operative with the weighing mechanism for permitting the valve to move toward its closed position on the descent of the bucket, a toggle for arresting the complete closing of the valve during the final part of the descent of the bucket, means operative with the weighing mechanism to break said toggle to thereby permit said valve to fully close, and a second toggle for locking the valve shut when the other toggle is broken.

5. The combination of weighing mechanism including a bucket, means for supplying a stream of material to said bucket, a valve for controlling said stream, and two connected toggles, one normally operative to prevent full closing of the valve and the other operative when the companion toggle is broken for locking the valve shut.

6. The combination of weighing mechanism including a bucket, means for supplying a stream of material to said bucket, a bell-shaped valve for controlling the stream, a telescopic rod depending from the valve, having a spring interposed between the sections thereof, and means on the bucket for applying an upward thrust to said rod on the ascent of the bucket for the purpose of tensioning said spring.

7. The combination of weighing mechanism including a bucket, means for supplying a stream of material to said bucket, a bell-shaped valve for controlling said stream, a telescopic rod pendent from interior of the valve and having a spring disposed between the sections thereof, means on the bucket for imparting an upward thrust to said rod to compress said spring, and means to lock said valve shut until after the contents of the bucket are discharged therefrom.

8. The combination of stream supplying means, a valve for controlling the stream, and two coöperative toggles each coöperative with the valve, one for preventing the full closing movement of the valve and operable when flexed to release the other toggle to permit the latter to lock said valve shut.

9. The combination of weighing mechanism including a bucket, means for supplying a stream of material to said bucket, a valve, coöperative toggles, one for locking the valve shut and the other for holding the valve against closing movement, means for flexing the latter toggle on the completion of a load in the bucket, and automatically operative means for effecting the discharge of the contents of the bucket on said flexure.

10. The combination of weighing mechanism including a bucket, means for supplying a stream of material to said bucket, a valve for controlling said stream, a toggle for locking the valve shut, and a manually shiftable lever operative by said toggle for causing the discharge of the contents of said bucket.

11. The combination of weighing mechanism including a bucket, means for supplying a stream of material to said bucket, a valve for controlling said stream, a toggle for locking the valve shut, and comprising two jointed members, and a manually shiftable lever connected with the toggle at the joint between the sections thereof and operable normally for causing the discharge of the contents of said bucket.

12. The combination of a valve, a toggle for locking the valve shut and loosely connected therewith to permit movement of the valve independently of the toggle, and means for arresting the motion of the valve before the same is finally closed.

13. The combination of stream supplying means, a valve for controlling the stream, a toggle for locking the valve shut, one of the members being loosely connected with the valve to permit the valve to have a partial closing movement independently of the toggle, and a second toggle to prevent full closing movement of said valve.

14. The combination of a bell-shaped valve, a pin connected with the valve within the same, a toggle for locking the valve shut, one of the members thereof having a slot to receive said pin to permit relative movement of the valve with respect to the toggle, and means for preventing full closing movement of the valve.

15. The combination of a bell-shaped valve having a pendent telescopic member connected to the interior thereof provided with a spring between the sections thereof and said valve being also provided with a pin, and a toggle to lock said valve shut, one of the toggle members having an elongated slot to receive said pin.

16. The combination of a bell-shaped valve, a toggle to lock the valve shut and connected with the valve interiorly thereof, the latter being so connected with the toggle as to permit relative closing movement of the valve independently of the toggle, and means to prevent full closing movement of the valve.

17. The combination of a bell-shaped valve, a toggle to lock the valve shut, said toggle being connected with the valve interiorly thereof to permit relative closing movement of the valve independently of the toggle, and a toggle to prevent full closing movement of said valve.

18. The combination of weighing mechanism including a bucket having a discharge valve, a toggle to normally lock said valve shut, one of the toggle members having a projecting member, a pair of levers to act against said projecting member, and a weight for closing said valve flexibly connected with said levers.

19. The combination of weighing mechanism including a bucket provided with a discharge valve, a weight in the bucket, a pair of levers, links connecting the levers with the weight, and means for transferring the effect of said levers to the valve to shut the same.

20. The combination of weighing mechanism including a bucket, means for supplying a stream of material to said bucket, a bell-shaped valve for controlling said stream, a telescopic rod pendent from the valve and connected to the same interiorly thereof, said rod having a spring interposed between the sections thereof, and means on the bucket to impart an upward thrust to the rod for compressing said spring.

21. The combination of weighing mechanism including a bucket, means for supplying a stream of material to said bucket, a bell-shaped valve for controlling said stream, a telescopic rod pendent from the valve and connected to the same interiorly thereof, said rod having a spring interposed between the sections thereof, and adjustable means on the bucket for imparting an upward thrust to said rod for compressing said spring.

22. The combination of a tank having an outlet, a bell-shaped valve in said tank to control said outlet, a toggle loosely connected with the valve interiorly thereof to permit movement of the valve relatively to the toggle, said toggle when in its locking position serving to hold said valve shut, a second toggle coöperative with the first toggle and operative when in its locking position to prevent locking movement of the first-mentioned toggle and cut-off movement of the valve, and weighing mechanism including a bucket to be supplied with material from said tank, said weighing mechanism having means to break the second toggle and thereby release said valve.

23. The combination of a tank having a discharge outlet, a bell-shaped valve to control said outlet, weighing mechanism including a bucket to be supplied with material from said tank, a telescopic member connected with the valve interiorly thereof and depending therefrom, said telescopic member having a spring interposed between the sections thereof and the lower end being in position for engagement by the weighing mechanism to tension said spring, a toggle coöperative with the valve and adapted when in its locking relation to hold said valve shut, and a second toggle coöperative with the other toggle and adapted when in its locking relation to hold said valve against cut-off movement, the weighing mechanism being provided with means to break the second toggle thereby to release the first toggle and the valve to permit cut-off movement of the latter.

24. The combination of a tank having a discharge outlet, a bell-shaped valve in the tank for controlling said outlet, weighing mechanism including a bucket to receive material from the tank, a telescopic member connected with the valve interiorly thereof and having a spring between the sections thereof and a pin carried by the upper section thereof, said telescopic member being in position for engagement by the weighing mechanism to tension the spring, a toggle having an elongated slot to receive said pin and operable when in its locking position to hold said valve shut, a second toggle adapted when in its locking position to prevent cut-off movement of the valve, and means on the weighing mechanism for breaking the second toggle.

25. The combination of weighing mechanism including a bucket, a supply tank having an outlet for the passage of a stream of material into said bucket, a bell-shaped valve to control said outlet, a telescopic member connected with the valve interiorly thereof and having a spring interposed between the sections thereof, a cross-bar fastened to the bucket within the same and provided with an actuator to exert an upward thrust against said telescopic member to compress said spring on the ascent of the bucket, a pin on the upper section of the telescopic member, a toggle adapted when locked to hold said valve shut, one section of the toggle having an elongated slot to receive said pin, a second toggle adapted when locked to prevent cut-off movement of the valve, and means on said cross-bar for breaking the second toggle to permit cut-off movement of said valve.

In testimony whereof I have hereunto set my hand in presence of two subscribing witnesses.

HENRY RICHARDSON.

Witnesses:
H. E. GODFREY,
E. J. QUINN.